(12) United States Patent
Wang

(10) Patent No.: US 7,224,271 B2
(45) Date of Patent: May 29, 2007

(54) SIGNAL ASSEMBLY

(76) Inventor: Shiunn-Terny Wang, No. 161, Szuteh Rd., Wufeng Hsiang, Taichung Hsien (TW)

( * ) Notice: Subject to any disclaimer, the term of this patent is extended or adjusted under 35 U.S.C. 154(b) by 154 days.

(21) Appl. No.: 11/110,677

(22) Filed: Apr. 21, 2005

(65) Prior Publication Data
US 2005/0285757 A1 Dec. 29, 2005

(30) Foreign Application Priority Data
Jun. 24, 2004 (TW) .............................. 93209947 U

(51) Int. Cl.
*B60Q 7/00* (2006.01)
(52) U.S. Cl. ................ 340/473; 340/691.1; 340/693.9; 340/815.4; 362/102; 362/190; 362/191; 362/285; 362/388; 248/155.4; 248/177.1
(58) Field of Classification Search .................... None
See application file for complete search history.

(56) References Cited
U.S. PATENT DOCUMENTS

| | | | | |
|---|---|---|---|---|
| 3,593,016 A * | 7/1971 | Gerdel | ........................ | 362/257 |
| 4,776,766 A * | 10/1988 | Brent | ........................ | 417/44.6 |
| 5,934,628 A * | 8/1999 | Bosnakovic | ............. | 248/177.1 |
| 6,206,541 B1 * | 3/2001 | Landamia | .................... | 362/184 |
| 6,259,373 B1 * | 7/2001 | Ghahramani | ............. | 340/815.4 |
| 6,454,228 B1 * | 9/2002 | Bosnakovic | ............. | 248/177.1 |
| 6,502,954 B1 * | 1/2003 | Demkowski | ................ | 362/198 |
| 7,011,423 B2 * | 3/2006 | Chen | .......................... | 362/102 |
| 7,063,444 B2 * | 6/2006 | Lee et al. | .................... | 362/285 |

\* cited by examiner

*Primary Examiner*—Benjamin C. Lee
(74) *Attorney, Agent, or Firm*—Rosenberg, Klein & Lee

(57) ABSTRACT

A signal assembly includes a light device connected to a light stick which has three connection hooks extending from an outer periphery thereof. A first connection assembly is mounted to the light stick and includes a first ring and a second ring connected with each other, wherein the first ring has a first flange extending outward from a first end thereof and three notches are defined through the first flange. The connection hooks are removably engaged with the three notches and hooked with the first flange by rotating the light stick relative to the first ring. By this way the light stick is able to be separated from the first connection assembly. Three leg plates are pivotably connected to the first connection assembly.

7 Claims, 9 Drawing Sheets

SIGNAL ASSEMBLY

FIELD OF THE INVENTION

The present invention relates to a signal assembly wherein the light stick can be separated from the legs and held by the users.

BACKGROUND OF THE INVENTION

A conventional signal assembly is disclosed in FIGS. 7–9, and generally includes a tube 50 which includes battery section 52 and a light bulb section 51, a sleeve 71 is slidably mounted to the tube 50 and three leg plates 70 are pivotably connected to the sleeve 71, three extension rods 72 are pivotably connected between the tube 50 and the three leg plates 70, and a light device 60 is pivotably connected between two lugs of a frame 54 which is connected to a base 53 which is connected to a top of the tube 50. Two conductive members 55 are connected to the two lugs of the frame 54 and the light device 60 is electrically connected to the conductive member 55 by two conductive pins 61. The three leg plates 70 can be pivoted and cooperated with a transverse plate 73 to form a warning triangular frame as shown in FIG. 9 and the light device 60 provide illumination. The conventional signal assembly is mainly focused on a stationary waning purpose and is too big to be held by the users when needed.

The present invention intends to provide a signal assembly which includes a light stick that can be separated from the leg plates and can be held by the users conveniently.

SUMMARY OF THE INVENTION

The present invention relates to a signal assembly which comprises a light device connected to a light stick and three connection hooks extend from an outer periphery of the light stick. A first connection assembly is mounted to the light stick and includes a first ring and a second ring which is mounted to the first ring. The first ring has a first flange extending outward from a first end thereof and three notches are defined through the first flange. The second ring has three openings defined in a lower end thereof. The connection hooks are engaged with the three notches and hooked with the first flange by rotating the light stick relative to the first ring. Three leg plates each have a first end pivotably engaged with the three openings in the second ring. A second connection assembly is slidably mounted to the light stick and three stretch rods are pivotably connected between the three leg plates and the second connection assembly.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
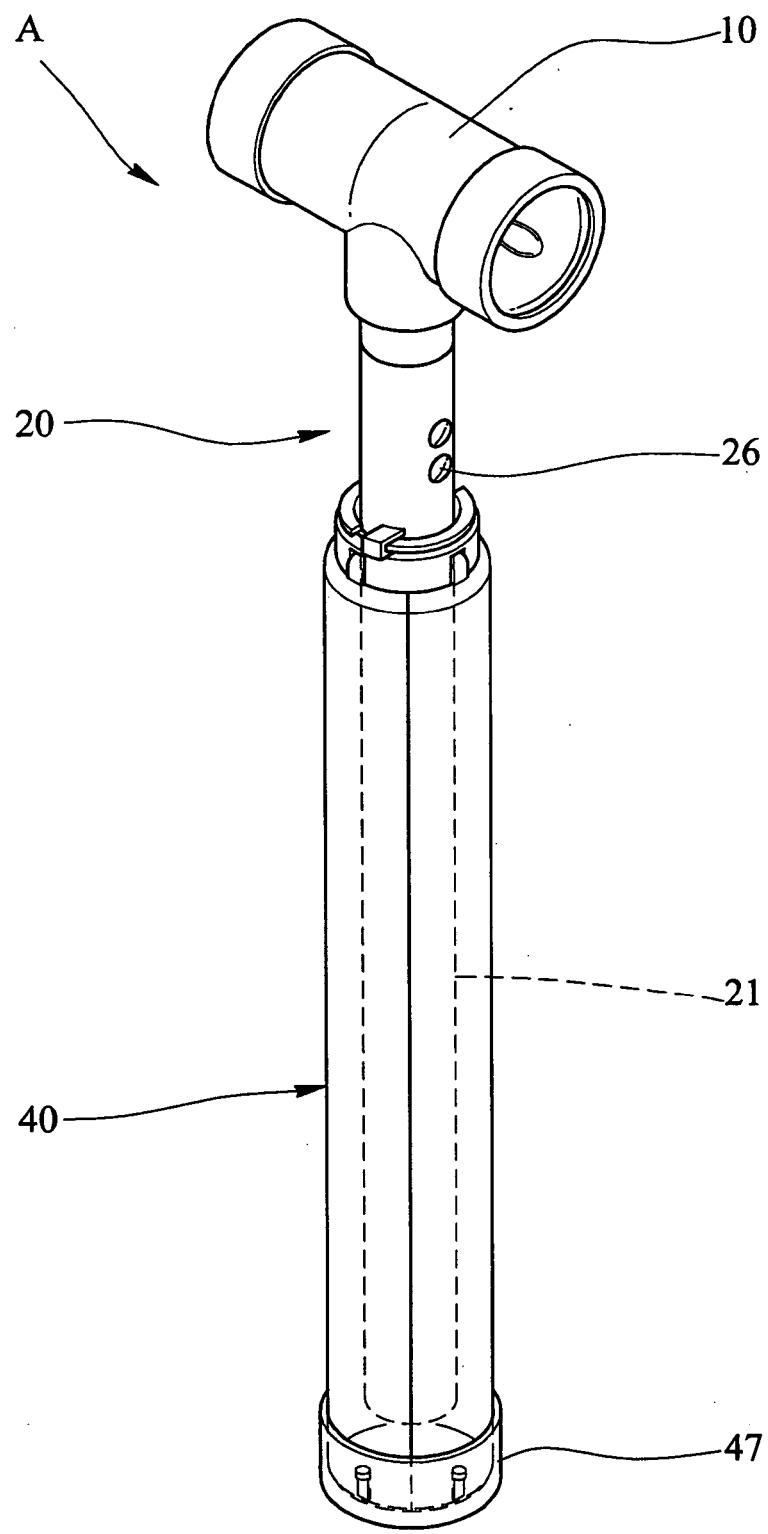
FIG. 1 is a perspective view to show the signal assembly of the present invention.
Figure 2:
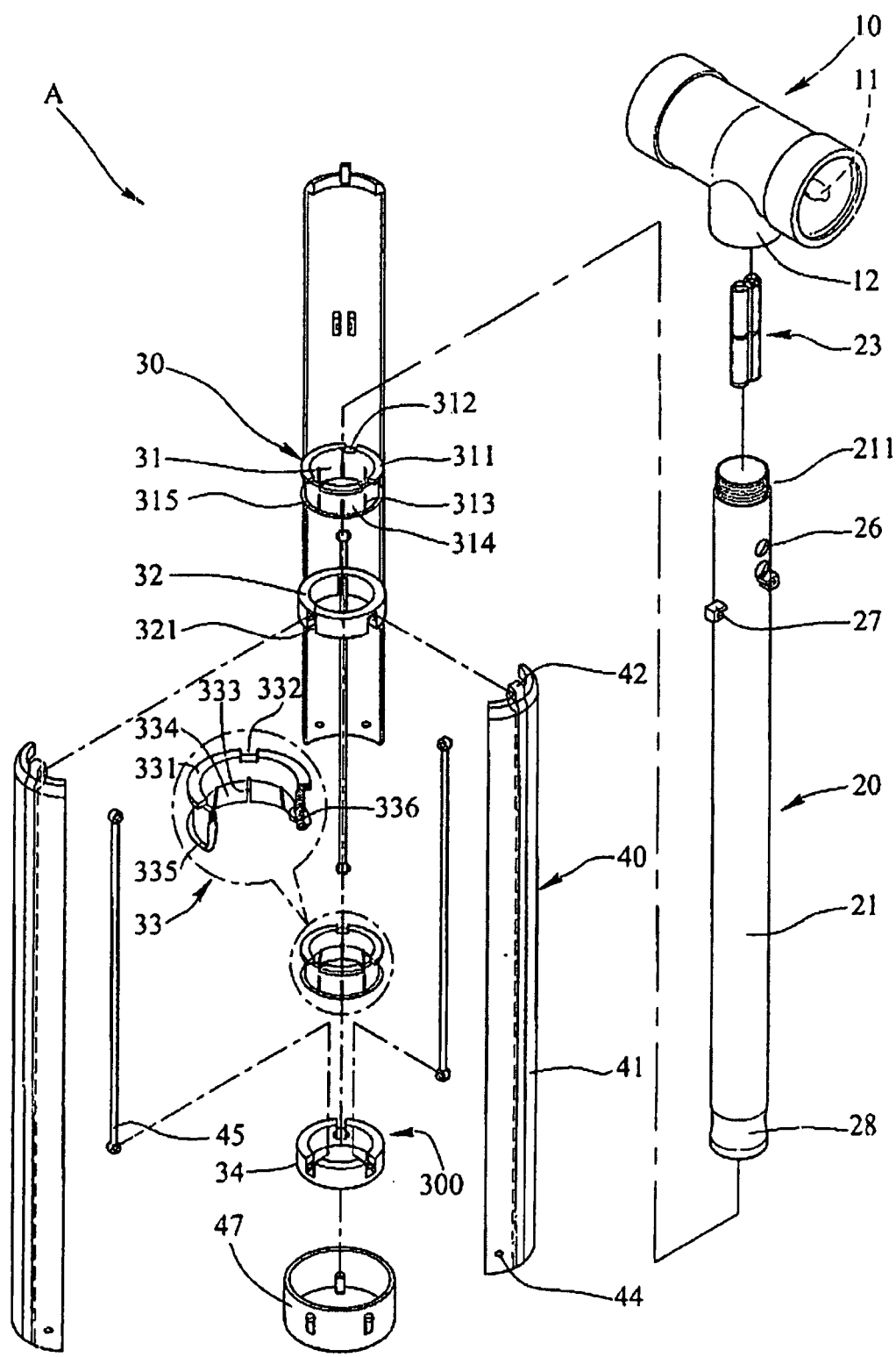
FIG. 2 is an exploded view to show the signal assembly of the present invention.
Figure 3:
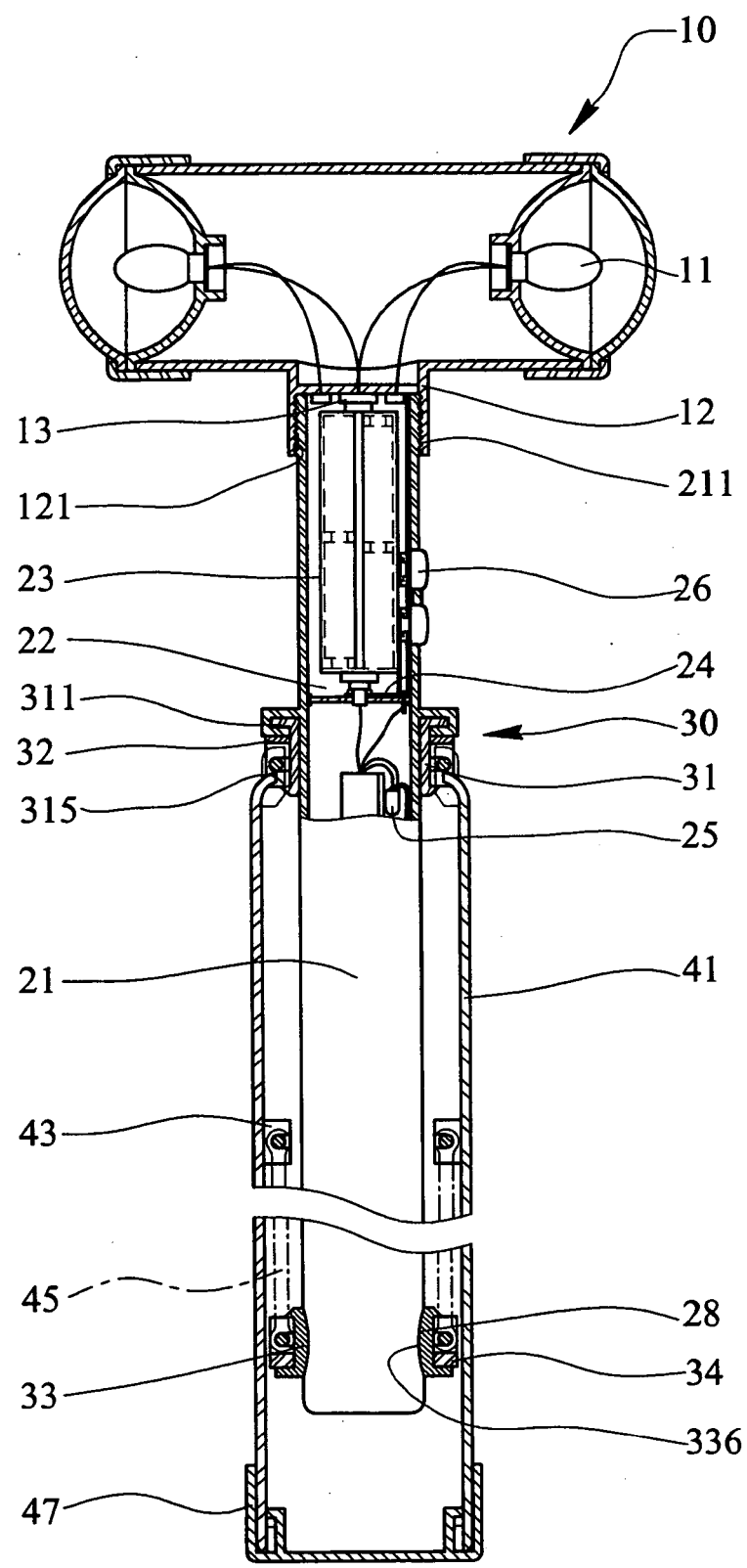
FIG. 3 is a cross sectional view to show the signal assembly of the present invention.

Referring to FIGS. 1 to 3, the signal assembly "A" of the present invention comprises a light device 10 that is a tubular member with two light bulbs 11 on two ends thereof and a connection neck 12 extends from a mediate portion of the light device 10. A light stick 20 is a transparent or semi-transparent tube 21 and has a threaded portion 211 on a first end thereof so that the connection neck 12 is threadedly connected with the threaded portion 211 of the light stick 20. A battery pack 23 and a light bulb 25 are received in an interior 22 of the light stick 20. A control circuit board 24 is electrically connected to the battery pack 23 and a light bulb 25. The other end of the battery pack 23 is connected to a conductive plate 13 in the connection neck 12 and the two light bulbs 11 are electrically connected to the conductive plate 13. A switch assembly 26 is electrically connected to the control circuit board 24 and exposed from the outer periphery of the light stick 20 so that the user may optionally operate the light device 10 and/or the light bulb 25 in the light stick 20. Three connection hooks 27 extend from an outer periphery of the light stick 20.

A first connection assembly 30 is mounted to the light stick 20 and includes a first ring 31 and a second ring 32. The first ring 31 has a first flange 311 extending outward from a first end thereof and three notches 312 are, defined through the first flange 311. A plurality of slits 313 are defined in the first ring 31 so as to form a plurality of flexible studs separated by the slits 313 such that the first ring 31 can be squeezed into a central hole of the second ring 32. A second flange 315 extends outward from a second end of the first ring 31.

The second ring 32 has three openings 321 defined in a lower end thereof. The light stick 20 extends through the first and second rings 31, 32 and the connection hooks 27 are engaged with the three notches 312 and hooked with the first flange 311 by rotating the light stick 20 relative to the first ring 31. In other words, the light stick 21 is able to separated from the first connection assembly 30 by operating the light stick 20 in reverse direction.

Three leg plates 40 each are an elongate and curve plate and have a protrusion 42 extending from an inside of a first end of each of the three leg plates 40 and the three protrusions 42 are engaged with the three openings 321 of the second ring 32. The second flange 315 extending outward from the second end of the first ring 31 supports and restricts the protrusion 42 within the opening 321.

A second connection assembly 300 mounted to a groove 28 defined in the outer periphery of a second end of the light stick 20, and includes a third ring 33 and a fourth ring 34 which is identical with the second ring 32 and is arranged to be up-side-down to let the openings face the third ring 33. The third ring 33 has a plurality of engaging bosses 336 extending from an inner periphery thereof and the engaging bosses 336 are engaged with the groove 28 of the light stick 20. Three stretch rods 45 are pivotably connected between three connection studs 43 in the inner side of the three leg plates 40 and the second connection assembly 300. The third ring 33 includes a third flange 331 extending from a first end thereof and three notches 332 are defined in the third flange 331 so as to receive the stretch rods 45 when the leg plates 40 are not opened. A fourth flange 335 extends outward from a second end of the third ring 33. The third ring 33 is engaged with a central hole of the fourth ring 34 and three respective ends of the three stretch rods 45 are respectively engaged with the openings in the fourth ring 34 and restricted by the fourth flange 335.

Figure 4:
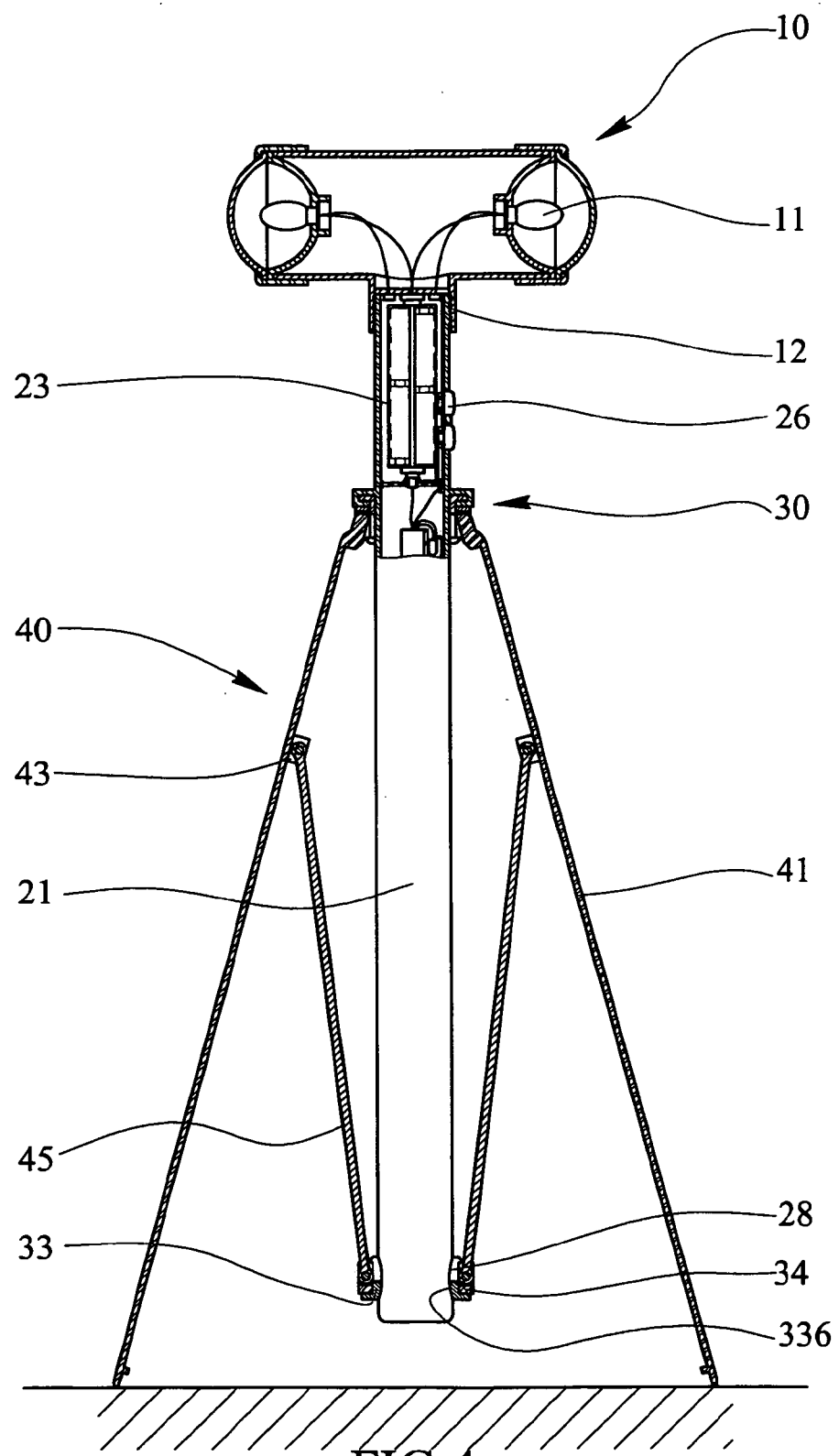
FIG. 4 is a cross sectional view to show the signal assembly of the present invention, wherein the leg plates are opened wide.
Figure 5:
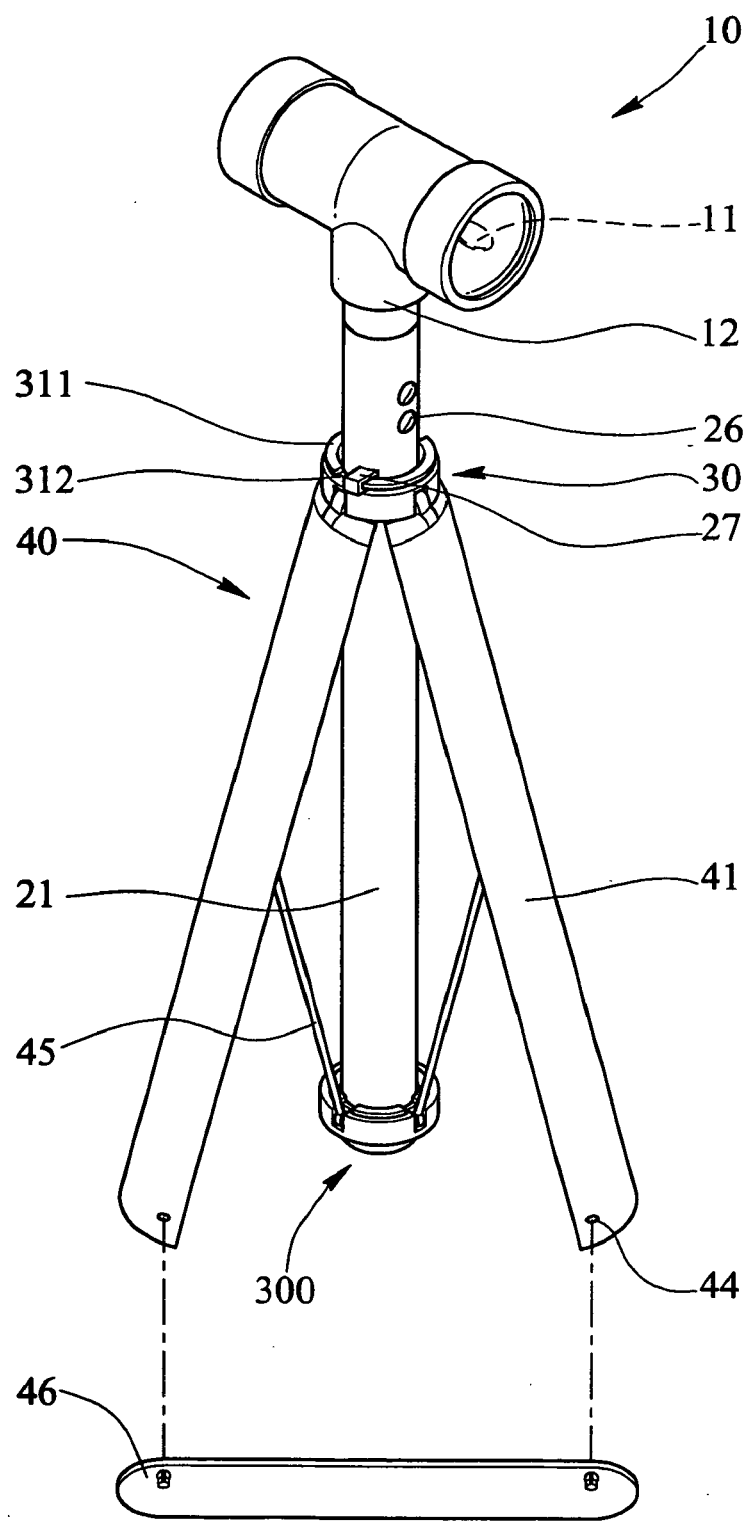
FIG. 5 is a perspective view to show the signal assembly of the present invention with the leg plates opened wide.

As shown in FIGS. 4 and 5, the three leg plates 31 can be pivoted outward about the first connection assembly 30 and the three stretch rods 45 are pivoted outward to provide a stable structure. A transverse plate 46 can be fixed between any two adjacent leg plates 40 by proper connection members which connect the two ends of the transverse plate 46 to the two connection holes 44 in the leg plates 40. The transverse plate 46 and the two leg plates 40 forms a triangular warning sign.

Figure 6:
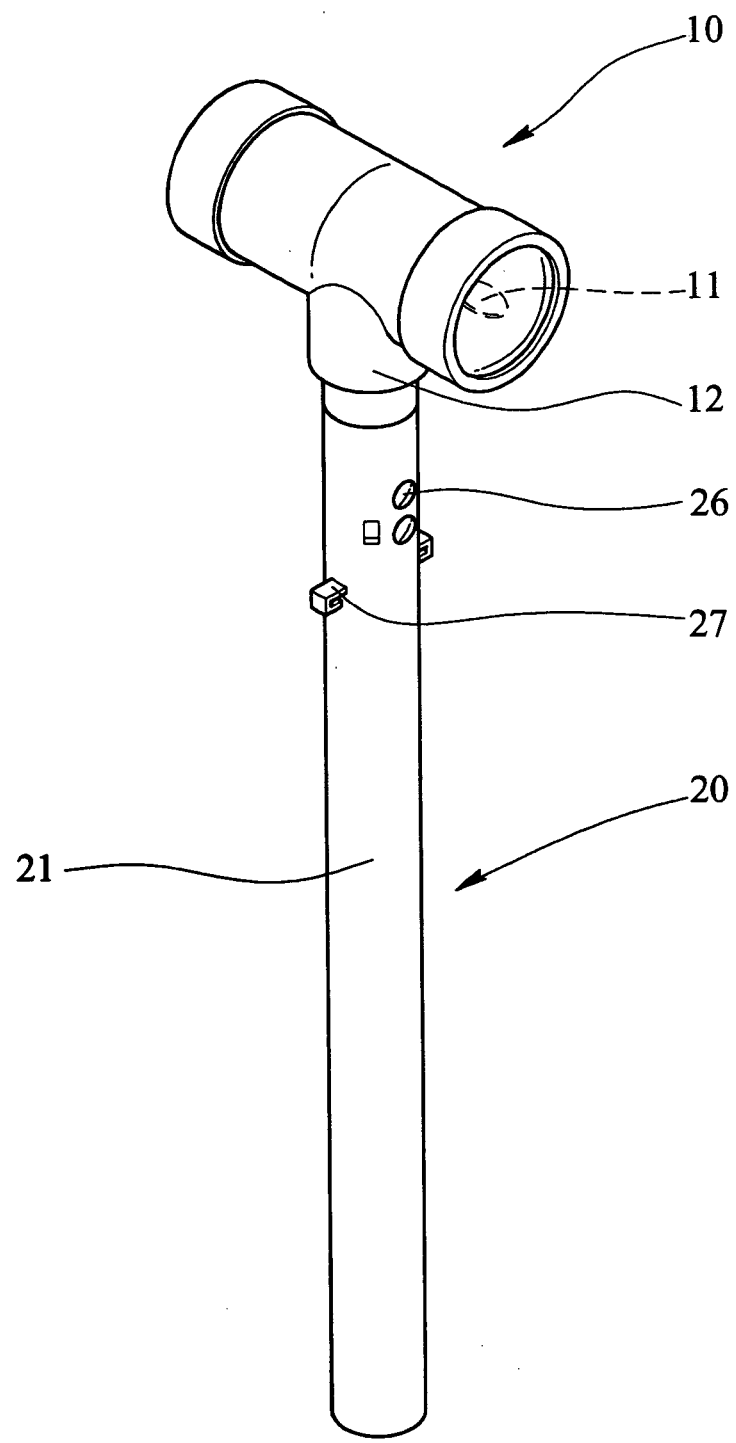
FIG. 6 shows that the light stick is independently used.
Figure 7:
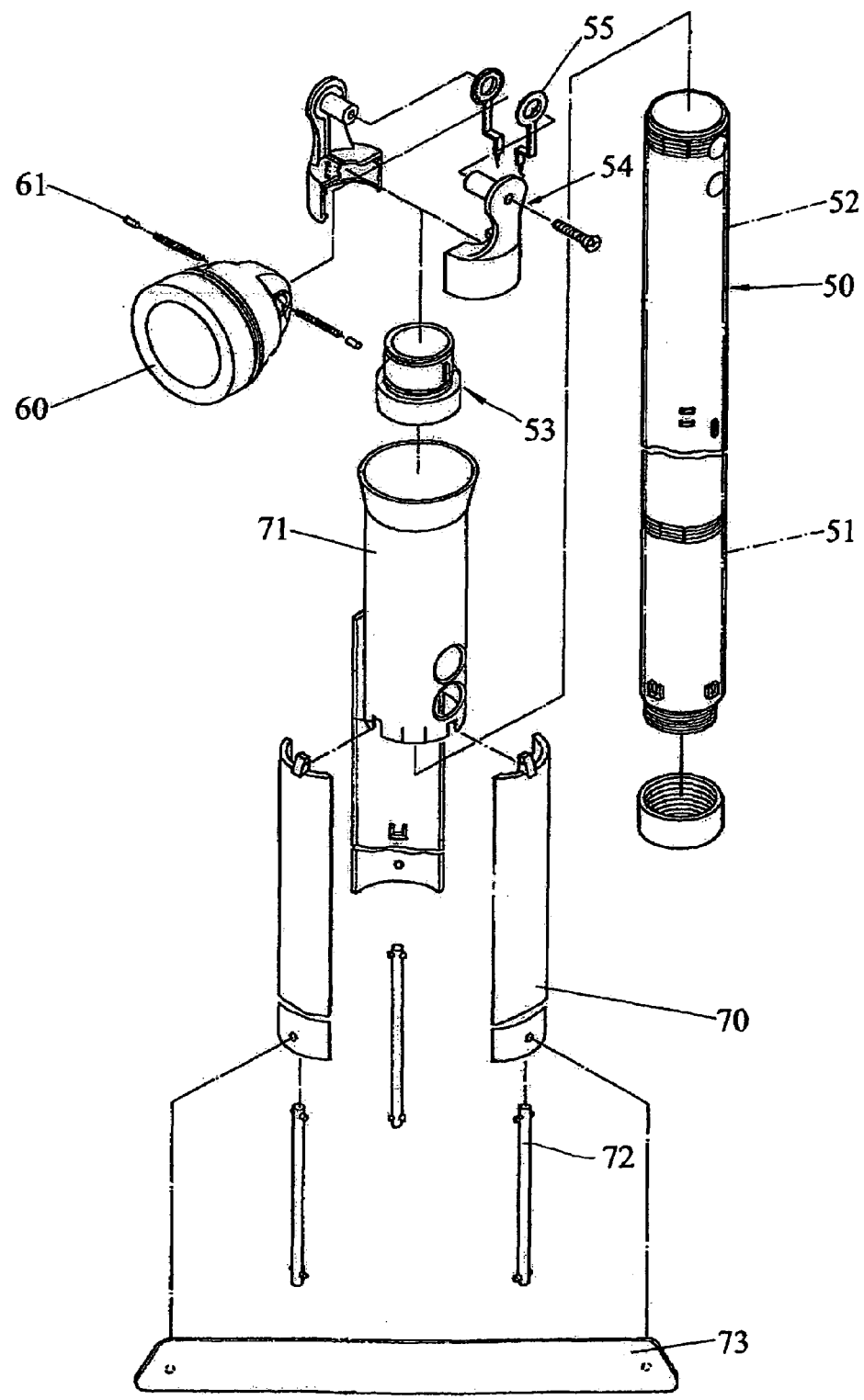
FIG. 7 is an exploded view to show a conventional signal assembly.
Figure 8:
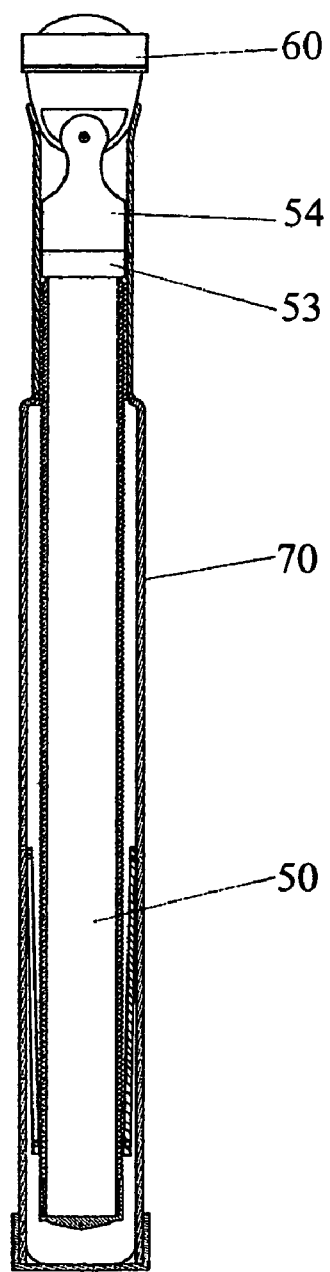
FIG. 8 is a cross sectional view of the conventional signal assembly.
Figure 9:
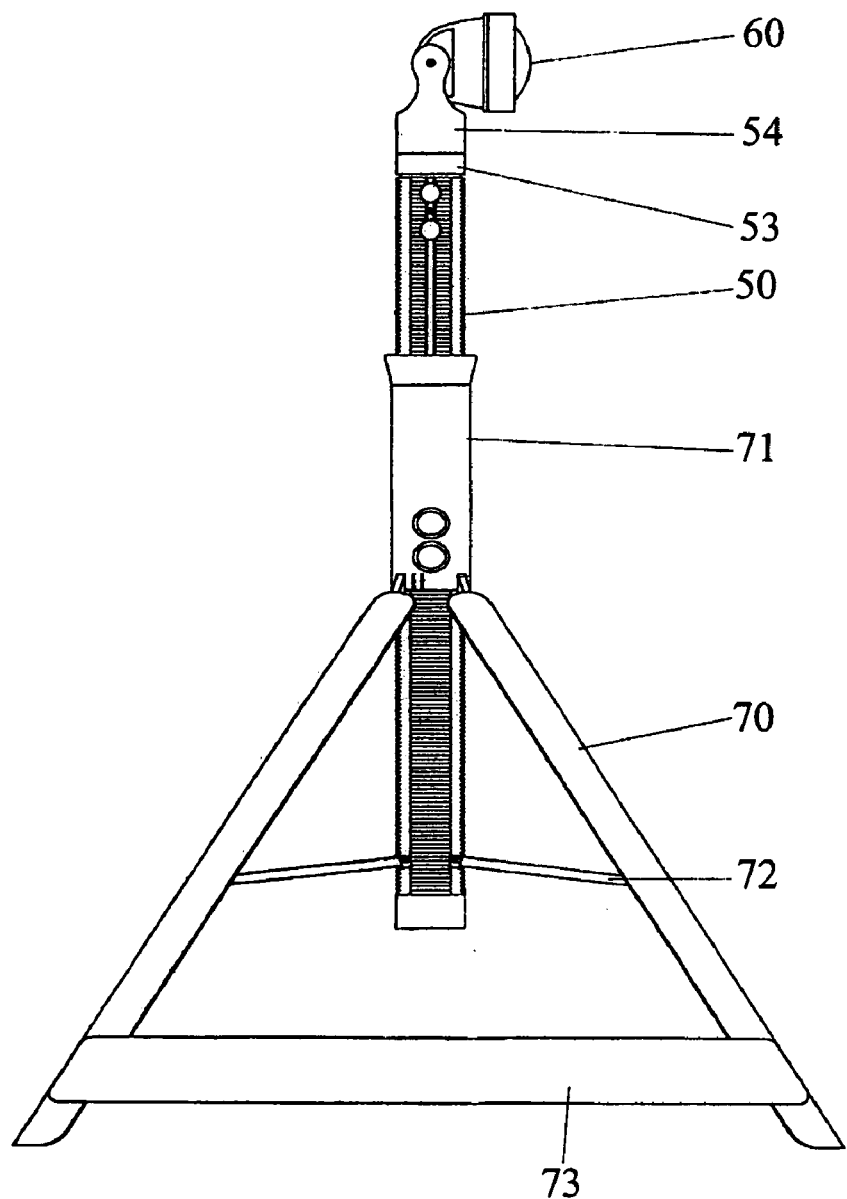
FIG. 9 shows that the leg plates of the conventional signal assembly are opened wide.

As shown in FIG. 6, the light stick 20 can be easily separated from the first and second connection assemblies 30, 300 and the leg plates 40 by rotating it relative to the first ring 31 and removing the connection hooks 27 from the notches 312. The light stick 20 can be easily held by the users.

While we have shown and described the embodiment in accordance with the present invention, it should be clear to those skilled in the art that further embodiments may be made without departing from the scope of the present invention.

What is claimed is:

1. A signal assembly comprising:
   a light device;
   a light stick having a first end connected to the light device and three connection hooks extending from an outer periphery of the light stick;
   a first connection assembly mounted to the light stick and including a first ring and a second ring, the first ring having a first flange extending outward from a first end thereof and three notches defined through the first flange, the second ring having three openings defined in a lower end thereof, the first ring inserted in a central hole of the second ring, the connection hooks removably engaged with the three notches and hooked with the first flange by rotating the light stick relative to the first ring;
   three leg plates each having a first end pivotably engaged with the three openings in the second ring, and
   a second connection assembly mounted to the light stick and having three stretch rods pivotally connected between the three leg plates and the second connection assembly.

2. The assembly as claimed in claim 1, wherein a protrusion extends from an inside of the first end of each of the three leg plates and the three protrusions are engaged with the three openings of the second ring, a second flange extends outward from a second end of the first ring and supports and restricts the protrusion within the opening.

3. The assembly as claimed in claim 1, wherein a plurality of slits defined in the first ring so as to form a plurality of flexible studs separated by the slits.

4. The assembly as claimed in claim 1, wherein a battery pack and a light bulb are received in an interior of the light stick, a control circuit board is electrically connected to the battery pack and a light bulb, a switch assembly is electrically connected to the control circuit board and exposed from the outer periphery of the light stick.

5. The assembly as claimed in claim 1, wherein the light device includes two light bulbs on two ends thereof and a connection neck extends from a mediate portion of the light device, the light stick has a threaded portion on the first end thereof so that the connection neck is threadedly connected with the threaded portion of the light stick.

6. The assembly as claimed in claim 1, wherein the second connection assembly includes a third ring and a fourth ring, the third ring includes a third flange extending from a first end thereof and three notches are defined in the third flange so as to receive the stretch rods when the leg plates are not opened, a fourth flange extends outward from a second end of the third ring, the fourth ring includes three openings which face the third ring, the third ring engaged with a central hole of the fourth ring and three respective ends of the three stretch rods are respectively engaged with the openings in the fourth ring and restricted by the fourth flange.

7. The assembly as claimed in claim 6, wherein the third ring has a plurality of engaging bosses extending from an inner periphery thereof and the engaging bosses are engaged with a groove defined in the outer periphery of a second end of the light stick.

* * * * *